(12) United States Patent
Saito

(10) Patent No.: US 7,408,580 B2
(45) Date of Patent: Aug. 5, 2008

(54) IMAGE DISPLAY APPARATUS, IMAGE DISPLAY METHOD AND COMPUTER PROGRAM

(75) Inventor: Kyota Saito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 656 days.

(21) Appl. No.: 11/096,974

(22) Filed: Apr. 1, 2005

(65) Prior Publication Data

US 2005/0225567 A1  Oct. 13, 2005

(30) Foreign Application Priority Data

Apr. 6, 2004  (JP) .............................. 2004-112462

(51) Int. Cl.
 *H04N 5/222* (2006.01)
(52) U.S. Cl. .............................. 348/333.02; 348/333.12; 348/445; 348/556
(58) Field of Classification Search ............ 348/333.01, 348/333.02, 333.12, 445, 556, 564; 345/689, 345/699; 386/131
See application file for complete search history.

(56) References Cited

U.S. PATENT DOCUMENTS

| | | | | |
|---|---|---|---|---|
| 5,392,069 A | * | 2/1995 | Koyama et al. ............. | 348/239 |
| 5,414,463 A | * | 5/1995 | Katoh et al. ............. | 348/240.2 |
| 5,675,389 A | * | 10/1997 | Oda ............................ | 348/468 |
| 5,686,969 A | * | 11/1997 | Baik ........................... | 348/556 |
| 5,767,830 A | * | 6/1998 | Kawamura .................... | 345/99 |
| 6,714,254 B2 | * | 3/2004 | Enomoto ..................... | 348/564 |
| 2003/0190136 A1 | | 10/2003 | Yamamoto | |

FOREIGN PATENT DOCUMENTS

JP  09322025 A  * 12/1997

* cited by examiner

*Primary Examiner*—David Ometz
*Assistant Examiner*—Gary C Vieaux
(74) *Attorney, Agent, or Firm*—Cowan, Liebowitz & Latman, P.C.

(57) ABSTRACT

Each of image display apparatus, an image display method and a computer program is arranged to select one of a first display mode of displaying an image of an image signal having a first aspect ratio in the image display area and a second display mode of displaying an image of an image signal having a second aspect ratio in the image display area, superpose a character signal upon the image signal having the first aspect ratio in response to a character display command, change the second display mode to the first display mode, when the character display command is input while the second display mode is selected, and display an image of the image signal having the first aspect ratio, on which the character signal is superposed, in the image display area.

6 Claims, 3 Drawing Sheets

IMAGE DISPLAY APPARATUS, IMAGE DISPLAY METHOD AND COMPUTER PROGRAM

BACKGROUND OF THE INVENTION

1. Field of the Invention

The present invention relates to an image display apparatus, an image display method and a computer program, and more particularly to technologies suitable for displaying an image of video signals having character signals superposed thereon, such as characters and icons, in a video display area having an aspect ratio different from that of the image.

2. Related Background Art

As an image is captured in a 16:9 video mode with a video camera using a DV (Digital Video) format, video signals in upper and lower areas of an image pickup element of 4:3 aspect ratio are cut off and an image elongated in a vertical direction is output.

When this image is reproduced by a wide television having an aspect ratio of 16:9 widely used nowadays, the image is elongated in a horizontal direction and displayed correctly on the screen of 16:9.

During capturing and reproducing by a video camera, an image can be confirmed on a liquid crystal panel of the video camera. However, a liquid crystal panel is generally has a half line structure having an aspect ratio of 4:3 and has about 225 horizontal lines. The technologies proposed in Japanese Patent Application Laid-Open No. H07-294883 devises a liquid crystal drive circuit to realize wide display by thinning out video signals (horizontal lines) at a ratio of one per four scan lines when an image of 16:9 of the NTSC specifications is displayed on the liquid panel. With this liquid crystal driving method, the wide display can be realized only by modifying a liquid crystal driver circuit without dealing with signals to be input to the liquid crystal panel, so that this method is available to various systems.

This liquid crystal driving method is, however, associated with the problem that characters, icons and the like superposed on video signals are lost due to thinning-out of video signals. For example, as shown in a menu screen 40 shown in FIG. 4, a horizontal line of a character display is thinned out and it becomes very hard to recognize this character.

Similarly, when an image of the PAL specifications is displayed on a liquid crystal panel of the NTSC specifications, video signals are thinned out at a ratio of one per six scan lines. This poses the problem that a portion of a character is thinned out and it becomes hard to recognize it. To avoid this, Japanese Patent Application Laid-Open No. H09-322025 proposes the technologies of preventing a portion of a character, an icon and the like from being lost by controlling a thinning-out operation of video signals if a character and the like are superposed upon thinning-out lines.

However, the technologies proposed in Japanese Patent Application Laid-Open No. H09-322025 cannot deal with a high thinning-out ratio. When a 16:9 image of the PAL specifications among other images is to be displayed on a panel of the NTSC specifications, video signals are required to be thinned out at a ratio of 8:3 in order to display an original image thinned out at a ratio of 6:1 as the 16:9 image. A new approach to this high thinning-out ratio has been desired. Characters on the menu screen 40 shown in FIG. 4 for performing a variety of settings of the video camera, among other screens, are difficult to be recognized and users feel inconvenient.

SUMMARY OF THE INVENTION

It is an object of the invention to solve the above-described problems and provide an image display apparatus, an image display method and a computer program, capable of easy recognition of displayed information such as characters and icons in a video display area in which images having different aspect ratios are displayed.

In order to achieve the above-described object, one aspect of the present invention provides an image display apparatus comprising: a mode selection device for selecting one of a first video mode of acquiring an image signal having a first aspect ratio and a second video mode of acquiring an image signal having a second aspect ratio; a character composition device responsive to a character display command for superposing a character signal upon the image signal; and a display control device for displaying the image of the acquired image signal in the second aspect ratio, when said character display command is not input while said second video mode is selected, and for displaying the image of the acquired image signal in the first aspect ratio, on which the character signal is superposed, when said character display command is input while said second video mode is selected.

BRIEF DESCRIPTION OF THE DRAWINGS

The above-described object of the present invention will become apparent from the following drawings and the detailed description in conjunction with the drawings.

DESCRIPTION OF THE PREFERRED EMBODIMENTS

Embodiments of the present invention will be described with reference to the accompanying drawings.

Figure 1:
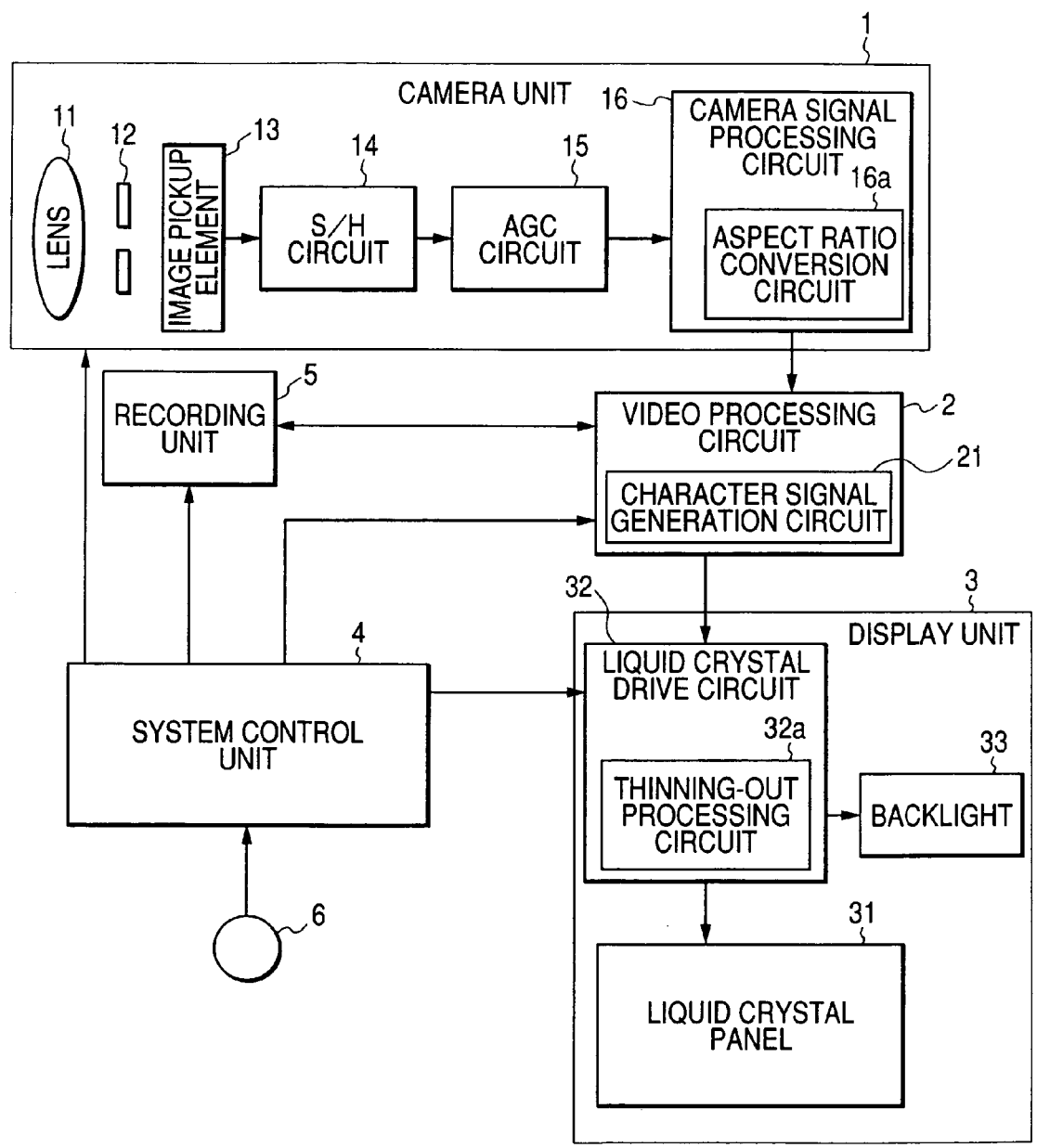
FIG. 1 is a block diagram showing an example of the inner structure of a video camera according to an embodiment of the present invention.

First, with reference to FIG. 1, description will be made on the structure of a video camera as an example of an image display apparatus according to an embodiment of the present invention. A video camera is constituted of: a camera unit 1 for capturing an object and generating video signals of the object image; a video processing circuit 2 for processing video signals supplied from the camera unit 1; a recording unit 5 for recording video signals supplied from the camera unit 1 via the video processing circuit 2; a display unit 3 for displaying an image in accordance with video signals supplied from the video processing circuit 2; and a system control unit 4 for controlling the operations of the camera unit 1, video processing circuit 2, recording unit 5 and display unit 3.

Detailed description will be made on the structure of each constituent element described above. The camera unit 1 has a lens 11, an iris 12, an image pickup element 13 constituted of charge coupling elements, an S/H (Sample/Hold) circuit 14, an AGC (Automatic Gain Control) circuit 15 and a camera signal processing circuit 16.

The image pickup element 13 acquires image information of an object via the lens 11 and iris 12 and supplies its output to the S/H circuit 14. The S/H circuit 14 sequentially samples an output signal from the image pickup element 13, and supplies its output to the AGC circuit 15. The AGC circuit 15 adjusts the gain of an output signal from the S/H circuit 14, and supplies its output to the camera signal processing circuit 16. The camera signal processing circuit 16 generates a video signal and supplies it to the video processing circuit 2.

The video processing circuit 2 executes VTR signal processing of the video signal supplied from the camera signal processing circuit 16 of the camera unit 1, and supplies its output to the recording unit 5 and display unit 3. The recording unit 5 executes a recording operation for recording a video signal in a recording medium and a reproducing operation for reproducing a video signal recorded in the recording medium. A character signal generation circuit 21 in the video processing circuit 2 generates a video signal of a character pattern such as characters and icons and superposes the character pattern signal upon a video signal to be supplied to the recording unit 5 and display unit 3.

The display unit 3 has a liquid crystal panel 31, a back light 33 and a liquid crystal drive circuit 32.

The liquid crystal panel 31 displays an image of the video signal supplied from the camera unit 1 via the video processing circuit 2. A display area of the liquid crystal panel 31 can switch between a normal screen (4:3) and a wide screen (16:9) based on a thinning-out process, by controlling a thinning-out processing circuit 32a in the liquid crystal drive circuit 32 by using a switching signal from the system control unit 4. The back light 33 illuminates the liquid crystal panel 31. The liquid crystal drive circuit 32 controls to drive the liquid crystal panel 31 and back light 33.

The system control unit 4 controls the operations of the camera unit 1, video processing circuit 2, recording unit 5 and display unit 3. The system control unit 4 controls each display manner of the liquid crystal panel 31. The system control unit 4 is realized by a microcomputer or the like having, for example, a ROM storing a control program and the like, a CPU for executing the control program and a RAM to be used as a work area when CPU executes the control program, or the like.

Figure 2:
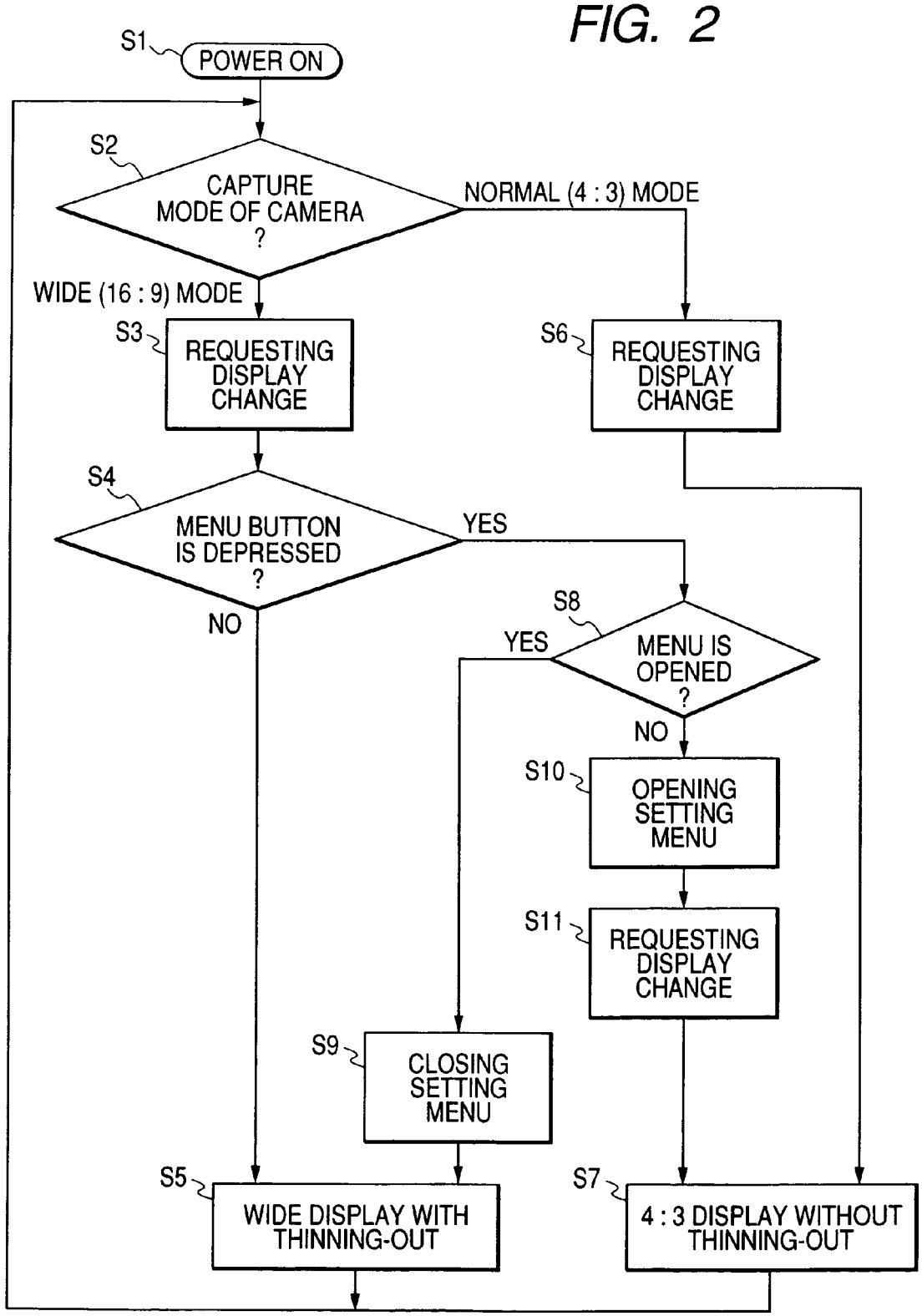
FIG. 2 is a flow chart illustrating an example of the operation of the video camera according to the embodiment of the present invention.

Next, with reference to the flow chart shown in FIG. 2, description will be made on an operation of displaying an image of an object captured with the video camera of the embodiment, on the liquid crystal panel 31.

As a photographer captures an object with the video camera, the camera signal processing circuit 16 of the camera unit 1 generates a video signal. Thereafter, the video processing circuit 2 executes necessary processes and the processed video signal is recorded in the recording unit 5. An image corresponding to the video signal is displayed on the liquid crystal panel 31 of the display unit 3. Characters, icons (figures) and the like for notifying the photographer of capturing conditions are also displayed on the liquid crystal panel 31.

Under the control of the system control unit 4, the camera unit 1 can switch between the normal screen (4:3) and the wide screen (16:9).

As a user photographs an object by selecting the 4:3 video mode, the camera unit 1 outputs a normal 4:3 video signal.

The video processing circuit 2 performs necessary processes for the video signal and superposes thereon the character pattern signal generated by the character signal generation circuit 21, outputs the resultant video signal to the display unit 3, and outputs the video signal on which the character pattern signal is not superposed, to the recording unit 5. The recording unit 5 records this. video signal. Since the video signal has the 4:3 aspect ratio, the system control unit 4 sends a request for switching the display method of the liquid crystal panel 31 to the normal screen, to the display unit 3 (Steps S2, S6). The liquid crystal drive circuit 32 drives the liquid crystal panel 31 in a normal manner without thinning-out (Step S7). In this case, since the character pattern displayed on the liquid crystal panel 31 is not thinned out, the user can clearly recognize the character pattern.

As the user captures an object by selecting the 16:9 video mode, an aspect ratio conversion circuit 16a of the camera signal processing circuit 16 of the camera unit 1, cuts off the video signal in upper and lower areas of the 4:3 image pickup element, and outputs a video signal elongated in the vertical direction to the video processing circuit 2. The video signal elongated in the vertical direction has an aspect ratio of the normal screen 4:3.

The video processing circuit 2 processes in a predetermined manner this video signal elongated in the vertical direction, and superposes upon the processed video signal the character pattern signal generated by the character signal generation circuit 21, outputs the resultant signal to the display unit 3 and outputs the video signal not superposing the character pattern signal to the recording unit 5. The recording unit 5 records the video signal elongated in the vertical direction.

Since the video signal has an aspect ratio of 16:9, the system control unit 4 sends a request for switching the display method for the liquid crystal panel 31 to the wide screen display with thinning-out, to the display unit 3 (Steps S2, S3). The liquid crystal drive circuit 32 drives the liquid crystal panel 31 through a thinning-out process (Step S5). In this case, since the character pattern displayed on the liquid crystal panel 31 is thinned out, horizontal lines of each character is partially lost so that it is hard for the user to recognize the character. However, in the usual capturing, the amount of characters and icons on the screen is not large and the user can memorize the display contents in the 4:3 video mode to some degree, not posing a serious problem.

Description will be made on the operation to be executed when a video camera setting menu screen in the 16:9 video mode is opened, which poses some problem.

Figure 3:
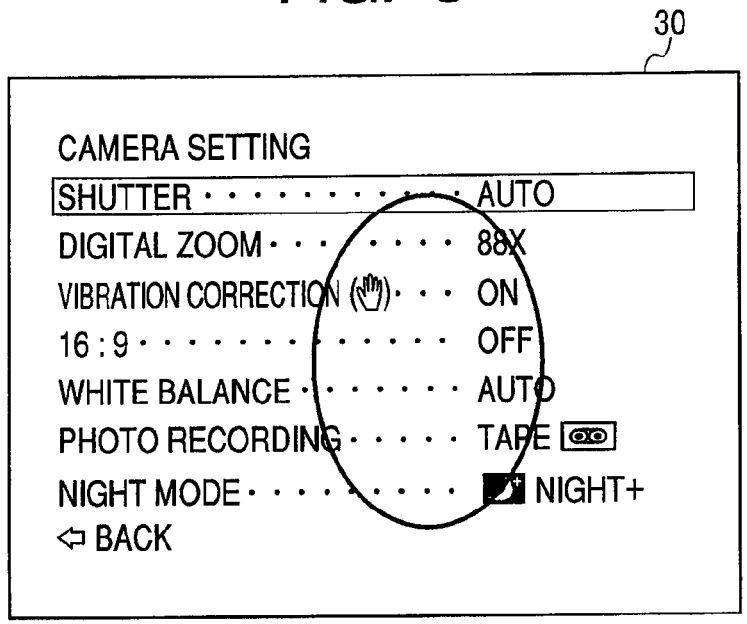
FIG. 3 is a diagram showing an example of a display screen including a character display, when a menu setting screen is displayed on a video camera, according to the embodiment of the present invention.
Figure 4:
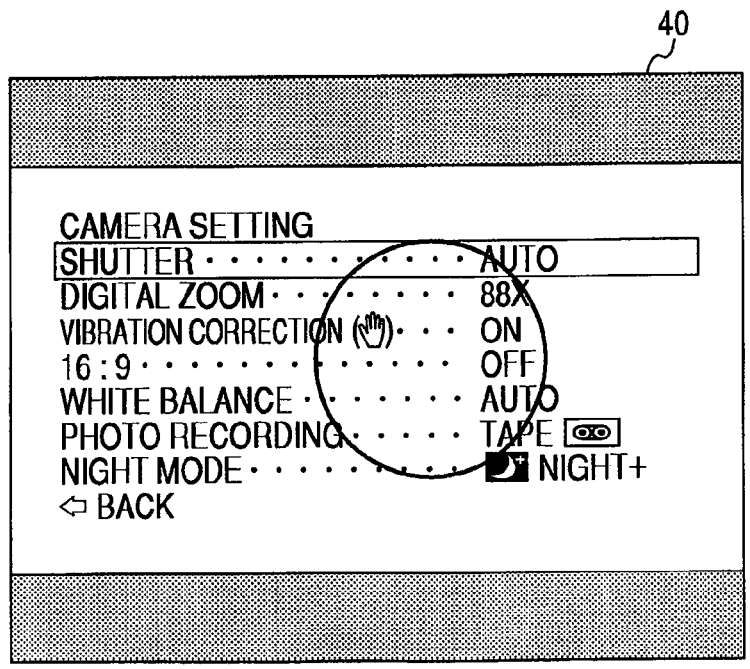
FIG. 4 is a diagram showing an example of a display screen including a character display, when a menu setting screen is displayed on a video camera, according to prior art.

As shown in FIG. 3, for example, displayed on a setting menu screen 30 are setting items for a video camera such as a shutter speed, digital zoom switching, on/off of vibration correction and the like. Since this setting menu screen 30 has a large amount of important character information, if horizontal lines of characters are lost by thinning-out or the like, the display quality of characters is degraded so that there arises a problem.

In order to avoid this, the user operates a menu switch 6 on the video camera main body (Step S4). In this embodiment, the user depresses a push button set in the menu switch 6. In this case, if the setting menu screen is not still opened, the liquid crystal drive circuit 32 opens the setting menu screen 30 in response to a request from the system control unit (Step S8→Step S10). The system control unit 4 sends a request for switching the wide screen with the thinning-out process to the normal screen, to the display unit 3 (Step S11).

During capturing in the 16:9 video mode, the video signal elongated in the vertical direction is supplied from the camera signal processing circuit 16. The video processing circuit 2 superposes the character pattern signal. The system control unit 4 sends a normal display request for thinning-out to the display unit 3. The liquid crystal drive circuit 32 drives the liquid crystal panel in the normal manner without thinning-out (Step S7). In this case, since the character pattern displayed on the liquid crystal panel 31 was not thinned out, the user can recognize clearly the character pattern as shown in FIG. 3. Although an image captured with the camera unit 1 to be displayed under characters of the menu is displayed elongated in the vertical direction, this poses no problem because the user opened the setting menu screen to conduct camera settings.

In this state (Step S10→Step S11→Step S7), as the user depresses the button switch set in the menu switch 6 (Step S4→Step S8), the liquid crystal drive circuit 32 closes the setting menu screen 30 in response to a request from the system control unit 4 (Step S9), and drives the liquid crystal panel 31 through the thinning-out process (Step S5) so that the thinning-out wide display becomes possible.

As described above, in this embodiment, a 16:9 image with thinning-out is displayed on the liquid crystal panel 31 having an aspect ratio of 4:3. Upon transition to the menu setting screen having a large amount of important characters and icons, thinning-out display of the liquid crystal panel 31 is automatically released so that a user can recognize characters which are otherwise thinned out and hard to be recognized. The user can therefore perform camera settings easily.

Since the thinned-out wide display 16:9 and normal display 4:3 without thinning-out can be switched automatically only by a depression of the push button set in the menu switch 6 by a user. Handling the video camera can further be improved and a user can perform various settings easily.

OTHER EMBODIMENTS OF THE PRESENT INVENTION

The scope of the invention contains also the case wherein software program codes realizing the function of the embodiment described above are supplied to a computer (CPU or MPU) of an apparatus or system connected to various devices realizing the embodiment function, and the computer of the apparatus or system operates the devices in accordance with the stored programs.

In this case, the software program codes themselves realize the embodiment function. Therefore, the program codes themselves and means for supplying the program codes, e.g., a storage medium storing the program codes, constitute the present invention. The storage medium for storing such program codes may be a flexible disk, a hard disk, an optical disk, a magneto optical disk, a CD-ROM, a magnetic tape, a nonvolatile memory card, a ROM or the like.

It is obvious that the program codes are included in the embodiment of the invention, wherein not only the computer executes the supplied program codes to realize the embodiment function but also the program codes in cooperation with an OS (operating system) running on the computer or with another software application or the like realize the embodiment function.

It is obvious that the scope of the invention also contains the case wherein the functions of each embodiment can be realized by writing the program codes into a memory of a function expansion board inserted into a computer or of a function expansion unit connected to the computer, and thereafter by executing a portion or the whole of actual processes by a CPU of the function expansion board or function expansion unit.

The present invention has been described in connection with preferred embodiments. The present invention is not limited only the above-described embodiments, but various changes may be made without departing from the scope of claims.

This application claims priority from Japanese Patent Application No. 2004-112462 filed on Apr. 6, 2004, which is hereby incorporated by reference herein.

What is claimed is:

1. An image display apparatus comprising:
   a mode selection device for selecting one of a first video mode of acquiring an image signal having a first aspect ratio and a second video mode of acquiring an image signal having a second aspect ratio;
   a character composition device responsive to a character display command for superposing a character signal upon the image signal; and
   a display control device for displaying the image of the acquired image signal in the second aspect ratio, when said character display command is not input while said second video mode is selected, and for displaying the image of the acquired image signal in the first aspect ratio, on which the character signal is superposed, when said character display command is input while said second video mode is selected.

2. The image display apparatus according to claim 1, further comprising:
   a button switch to be used by a user to instruct whether an image of the image signal having the character signal superposed by said character composition device is displayed or not,
   wherein said character composition device superposes the character signal upon the image signal having the first aspect ratio, in response to an input of said character signal display command by said button switch.

3. The image display apparatus according to claim 1, wherein an image of the image signal having the character signal superposed by said character composition device includes a setting screen of the image display apparatus.

4. The image display apparatus according to claim 1, wherein the first aspect ratio is 4:3 and the second aspect ratio is 16:9.

5. An image display method comprising:
   a mode selection step of selecting one of a first video mode of acquiring an image signal having a first aspect ratio and a second video mode of acquiring an image signal having a second aspect ratio;
   a character composition step, responsive to a character display command, of superposing a character signal upon the image signal; and
   a display control step of displaying the image of the acquired image signal in the second aspect ratio, when said character display command is not input while said second video mode is selected, and of displaying the image of the acquired image signal in the first aspect ratio, on which the character signal is superposed, when said character display command is input while said second video mode is selected.

6. A computer-readable storage medium storing a computer program comprising a code for causing a computer to execute an image display method, said method comprising:
   a mode selection step of selecting one of a first video mode of acquiring an image signal having a first aspect ratio and a second video mode of acquiring an image signal having a second aspect ratio;
   a character composition step, responsive to a character display command, of superposing a character signal upon the image signal; and a display control step of displaying the image of the acquired image signal in the second aspect ratio, when said character display command is not input while said second video mode is selected, and of displaying the image of the acquired image signal in the first aspect ratio, on which the character signal is superposed, when said character display command is input while said second video mode is selected.

* * * * *